(12) United States Patent
Kim

(10) Patent No.: US 11,422,309 B2
(45) Date of Patent: Aug. 23, 2022

(54) OPTICAL CONNECTOR

(71) Applicant: OPTICIS CO., LTD., Seongnam-si (KR)

(72) Inventor: Hee Dae Kim, Buk-gu Gwangju (KR)

(73) Assignee: OPTICIS CO., LTD., Gyeonggi-do (KR)

( * ) Notice: Subject to any disclaimer, the term of this patent is extended or adjusted under 35 U.S.C. 154(b) by 0 days.

(21) Appl. No.: 16/982,835

(22) PCT Filed: Jun. 21, 2019

(86) PCT No.: PCT/KR2019/007482
§ 371 (c)(1),
(2) Date: Sep. 21, 2020

(87) PCT Pub. No.: WO2020/004871
PCT Pub. Date: Jan. 2, 2020

(65) Prior Publication Data
US 2021/0103103 A1 Apr. 8, 2021

(30) Foreign Application Priority Data
Jun. 28, 2018 (KR) .................. 10-2018-0074917

(51) Int. Cl.
*G02B 6/34* (2006.01)
*G02B 6/122* (2006.01)
(Continued)

(52) U.S. Cl.
CPC .............. *G02B 6/34* (2013.01); *G02B 6/122* (2013.01); *G02B 6/29311* (2013.01);
(Continued)

(58) Field of Classification Search
CPC ...... G02B 6/34; G02B 6/122; G02B 6/29311; G02B 6/3652; G02B 6/4204; G02B 6/424; G02B 19/0028
See application file for complete search history.

(56) References Cited

U.S. PATENT DOCUMENTS 5,646,399 A 7/1997 Fukushima et al.
6,191,802 B1 * 2/2001 Kessler .................. B41M 5/265
347/225
(Continued)

FOREIGN PATENT DOCUMENTS

JP 63-65006 4/1988
JP 09-211270 8/1997
(Continued)

OTHER PUBLICATIONS

International Search Report for PCT/KR2019/007482, dated Oct. 1, 2019.
(Continued)

*Primary Examiner* — Ellen E Kim
(74) *Attorney, Agent, or Firm* — Nixon Peabody LLP; Jeffrey L. Costellia

(57) ABSTRACT

An optical connector includes: a base substrate; an optical fiber on the base substrate; a plurality of optical devices having different wavelength bands and arranged in a curved shape concave toward the optical fiber to surround an end surface of the optical fiber; and an optical path changing device between the optical fiber and the plurality of optical devices and configured to diffract or refract incident light at different angles according to wavelength bands of the incident light. According to the optical connector, the arrangement of a plurality of light-emitting or light-receiving devices may be simplified and the number of communication channels may be easily increased in a multiplexing or (Continued)

demultiplexing structure in which a plurality of communication channels are provided using a single optical fiber.

22 Claims, 16 Drawing Sheets

(51) Int. Cl.
*G02B 6/293* (2006.01)
*G02B 6/36* (2006.01)
*G02B 6/42* (2006.01)
*G02B 19/00* (2006.01)

(52) U.S. Cl.
CPC ......... *G02B 6/3652* (2013.01); *G02B 6/4204* (2013.01); *G02B 6/424* (2013.01); *G02B 19/0028* (2013.01)

(56) References Cited

U.S. PATENT DOCUMENTS

| | | | | |
|---|---|---|---|---|
| 6,741,390 | B2 | 5/2004 | Onaka et al. | |
| 7,339,975 | B2* | 3/2008 | Yamanaka | G02B 19/009 372/50.12 |
| 9,774,171 | B2* | 9/2017 | Kasai | H01S 5/4012 |
| 2002/0090172 | A1* | 7/2002 | Okazaki | H01S 5/4025 385/27 |
| 2004/0095969 | A1* | 5/2004 | Kaji | H01S 3/094003 372/6 |
| 2004/0196458 | A1* | 10/2004 | Shimizu | G01J 3/0259 356/328 |
| 2004/0233964 | A1* | 11/2004 | Yamanaka | G02B 19/0014 372/108 |
| 2004/0252388 | A1* | 12/2004 | Yamanaka | G02B 27/0905 359/834 |
| 2008/0267227 | A1 | 10/2008 | Seo et al. | |
| 2009/0213461 | A1 | 8/2009 | Hikichi et al. | |
| 2010/0007964 | A1* | 1/2010 | Huang | G02B 27/123 359/638 |
| 2013/0235459 | A1* | 9/2013 | Shiozaki | G02B 6/29311 359/569 |
| 2014/0233897 | A1* | 8/2014 | Ishikawa | G02B 6/4292 385/93 |
| 2016/0344162 | A1 | 11/2016 | Konno et al. | |
| 2017/0276946 | A1* | 9/2017 | Yokoyama | G02B 5/10 |

FOREIGN PATENT DOCUMENTS

| | | |
|---|---|---|
| JP | 2002-202442 | 7/2002 |
| JP | 2003-324227 | 11/2003 |
| JP | 2004-258624 | 9/2004 |
| JP | 2004-264446 | 9/2004 |
| JP | 2006-189672 | 7/2006 |
| JP | 2011-086905 | 4/2011 |
| KR | 10-2004-0070445 | 8/2004 |
| KR | 10-0900793 | 6/2009 |
| KR | 10-2012-0071032 | 7/2012 |
| KR | 10-2017-0138266 | 12/2017 |
| WO | WO-2015/115301 | 8/2015 |

OTHER PUBLICATIONS

Written Opinion for PCT/KR2019/007482, dated Oct. 1, 2019.
Korean Notice of Allowance for 10-2018-0074917, dated Oct. 17, 2019.
Korean Office Action for 10-2018-0074917, dated May 27, 2019.
Japanese Office Action for Japanese App. No. 2021-505175, dated Nov. 16, 2021, 10 pages.
Extended European Search Report (App. No. 19825982.2) dated Mar. 1, 2022 (9 pages).

* cited by examiner

OPTICAL CONNECTOR

CROSS-REFERENCE TO RELATED APPLICATION

This application claims the benefit of Korean Patent Application No. 10-2018-0074917, filed on Jun. 28, 2018, in the Korean Intellectual Property Office, the disclosure of which is incorporated herein in its entirety by reference.

BACKGROUND

1. Field

One or more embodiments relate to an optical connector.

2. Description of the Related Art

Optical connectors may be used to transmit digital visual interface (DVI) signals or high definition multimedia interface (HDMI) signals and may support wavelength division multiplexing (WDM) optical communication in which optical signals having different wavelength bands are transmitted through a single optical fiber providing a plurality of communication channels.

SUMMARY

One or more embodiments include an optical connector configured to simplify the arrangement of a plurality of light-emitting or light-receiving devices and easily increase the number of communication channels in a multiplexing or demultiplexing structure in which a plurality of communication channels are provided using a single optical fiber.

Additional aspects will be set forth in part in the description which follows and, in part, will be apparent from the description, or may be learned by practice of the presented embodiments.

According to one or more embodiments, an optical connector includes;

a base substrate;

an optical fiber on the base substrate;

a plurality of optical devices having different wavelength bands and arranged in a curved shape concave toward the optical fiber to surround an end surface of the optical fiber; and an optical path changing device between the optical fiber and the plurality of optical devices and configured to diffract or refract incident light at different angles according to wavelength bands of the incident light.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
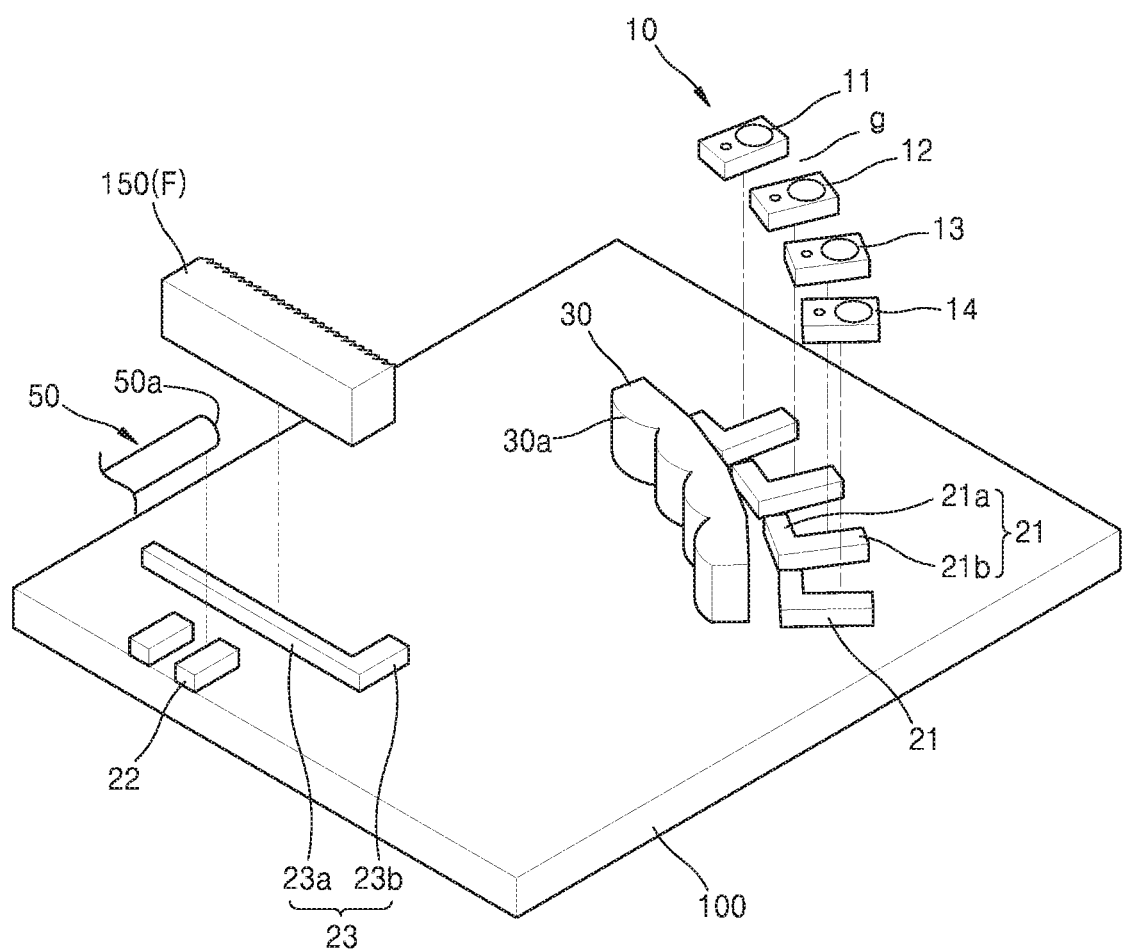
FIG. 1 is an exploded perspective view illustrating an optical connector according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

According to an aspect of the present disclosure, an optical connector includes:

a base substrate;

an optical fiber on the base substrate;

a plurality of optical devices having different wavelength bands and arranged in a curved shape concave toward the optical fiber to surround an end surface of the optical fiber; and an optical path changing device between the optical fiber and the plurality of optical devices and configured to diffract or refract incident light at different angles according to wavelength bands of the incident light.

For example, the plurality of optical devices may be configured to output light in reverse radial directions converging on a region of the optical path changing device or configured to receive light diverging from the region of the optical path changing device in radial directions.

For example, the optical path changing device may include a diffraction grating or a prism.

For example, the diffraction grating may include a transmissive diffraction grating, and the plurality of optical devices and the optical fiber may be arranged at opposite sides of the diffraction grating.

For example, the plurality of optical devices may be arranged along a curve concave toward the end surface of the optical fiber in an order from a shortest wavelength band to a longest wavelength band.

For example, the plurality of optical devices may be asymmetrically arranged with respect to an optical axis line perpendicular to the end surface of the optical fiber.

For example, the plurality of optical devices may be concentratively arranged at offset positions on one of left and right sides of an optical axis line perpendicular to the end surface of the optical fiber.

For example, the plurality of optical devices may include first to fourth optical devices having first to fourth wavelength bands that are different from each other, and the first to fourth optical devices may be arranged along a curve according to the first to fourth wavelength bands of the first to fourth optical devices in an order from the first wavelength band, which is shortest, to the fourth wavelength band, which is longest.

For example, the plurality of optical devices may be spaced apart from each other with a gap between neighboring optical devices.

For example, the plurality of optical devices may be arranged together on a flat surface of the base substrate.

For example, the optical path changing device may include a diffraction grating, and the plurality of optical devices may be arranged away from an optical axis line perpendicular to the end surface of the optical fiber sequentially from a position closest to the optical axis line to a position farthest from the optical axis line in an order from an optical device having a shortest wavelength band to an optical device having a longest wavelength band.

For example, the plurality of optical devices may include first to fourth optical devices having first to fourth wavelength bands that are different from each other, wherein light having the first wavelength band, which is shortest, may be diffracted by a smallest angle while passing through the diffraction grating along an optical path of the first optical device which is closest to the optical axis line of the optical fiber, and light having the fourth wavelength band, which is longest, may be diffracted by a largest angle while passing through the diffraction grating along an optical path of the fourth optical device which is farthest from the optical axis line of the optical fiber.

For example, light having the first to fourth wavelength bands may have relatively large angular deviations at one of an entrance side and an exit side of the optical path changing device, and the light having the first to fourth wavelength bands may have relatively small angular deviations at the other of the entrance side and the exit side of the optical path changing device.

For example, the optical connector may further include:

a plurality of first alignment guides respectively configured to align the plurality of optical devices;

a second alignment guide configured to align the optical fiber; and a third alignment guide configured to align the optical path changing device, wherein the first to third alignment guides are provided on the base substrate.

For example, the plurality of first alignment guides may be arranged in a curved shape concave toward the end surface of the optical fiber to surround the end surface of the optical fiber.

For example, the first to third alignment guides may include a first polymer.

For example, the optical connector may further include a collimator between the optical path changing device and the plurality of optical devices.

For example, the collimator may include a second polymer that is different from the first polymer of the first to third alignment guides.

For example, the optical path changing device may include a prism, and the plurality of optical devices may be arranged away from an optical axis line perpendicular to the end surface of the optical fiber sequentially from a position closest to the optical axis line to a position farthest from the optical axis line in an order from an optical device having a longest wavelength band to an optical device having a shortest wavelength band.

For example, the optical connector may further include:

a plurality of first alignment guides respectively configured to align the plurality of optical devices and a second alignment guide configured to align the optical fiber, the first and second alignment guides being provided on the base substrate; and a collimator between the optical path changing device and the plurality of optical devices, wherein the first and second alignment guides may include a first polymer, the collimator may include a second polymer, and the prism may include a third polymer, wherein the first to third polymers are different from each other.

For example, a polyhedron prism providing refracting surfaces having different angles in optical paths of the plurality of optical devices may be between the optical path changing device and the plurality of optical devices.

For example, the polyhedron prism may include a concave polygonal entrance or exit surface including the refracting surfaces having different angles.

For example, the plurality of optical devices may include first to fourth optical devices that are different from each other, and optical paths of the first to fourth optical devices may be changed by different angles as passing through first to fourth refracting surfaces having different angles.

For example, the first and fourth refracting surfaces located at peripheral positions among the first to fourth refracting surfaces have relatively large angles with respect to planes perpendicular to optical axes of the first and fourth optical devices, and the second and third refracting surfaces located at central positions among the first to fourth refracting surfaces have relatively small angles with respect to planes perpendicular to optical axes of the second and third optical devices.

For example, the optical paths of the first and fourth optical devices located at peripheral positions among the first to fourth optical devices may be changed by relatively large angles by the first and fourth refracting surfaces, and the optical paths of the second and third optical devices located at central positions among the first to fourth optical devices may be changed by relatively small angles by the first and third refracting surfaces.

For example, the optical paths of the first to fourth optical devices may have relatively large angular deviations at one of an entrance side and an exit side of the polyhedron prism, and the optical paths of the first to fourth optical devices may have relatively small angular deviations at the other of the entrance side and the exit side of the polyhedron prism.

Hereinafter, an optical connector will be described according to an embodiment with reference to the accompanying drawings.

Figure 2:
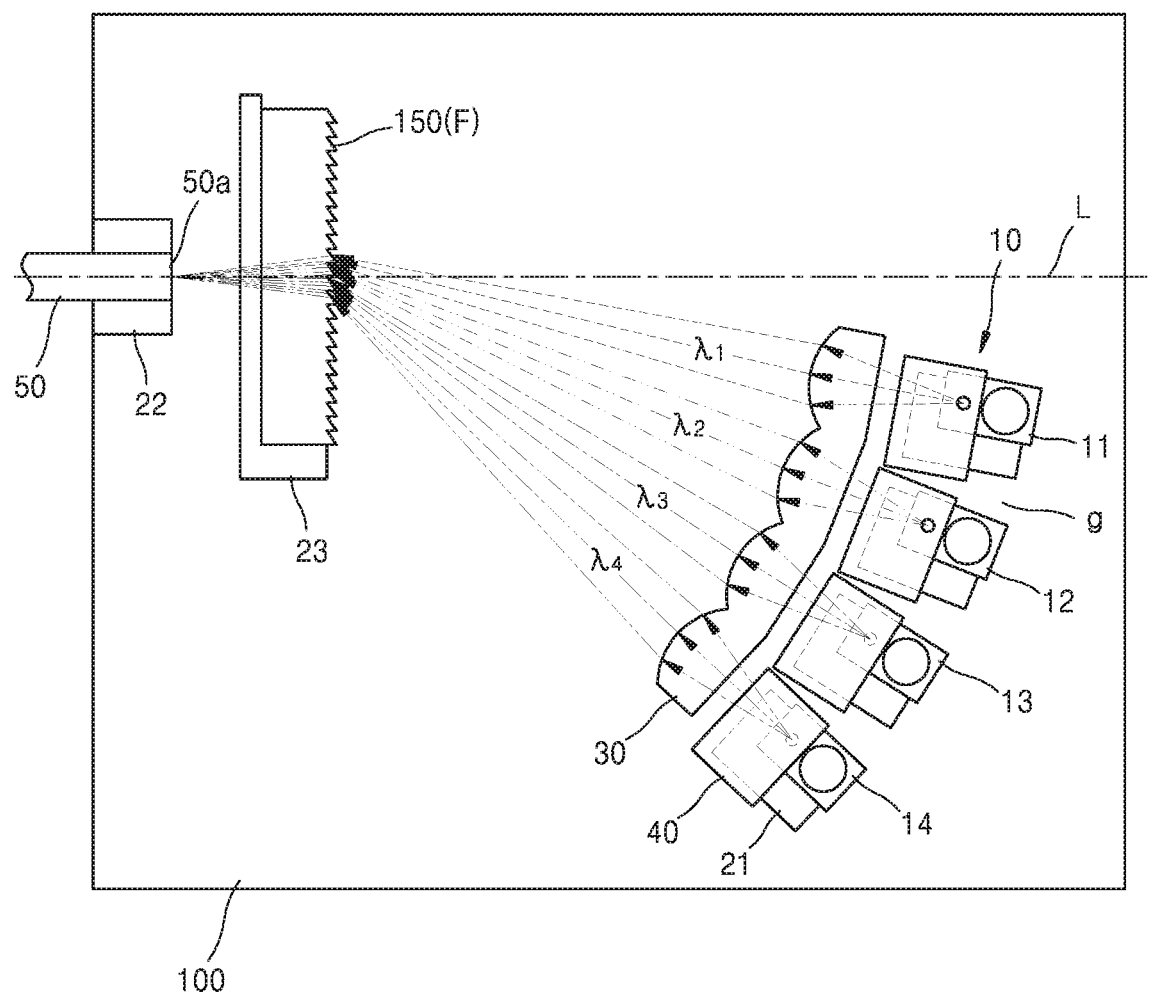
FIG. 2 is a plan view illustrating the optical connector shown in FIG. 1 for describing multiplexing at a transmitting end of a communication channel.
Figure 3:
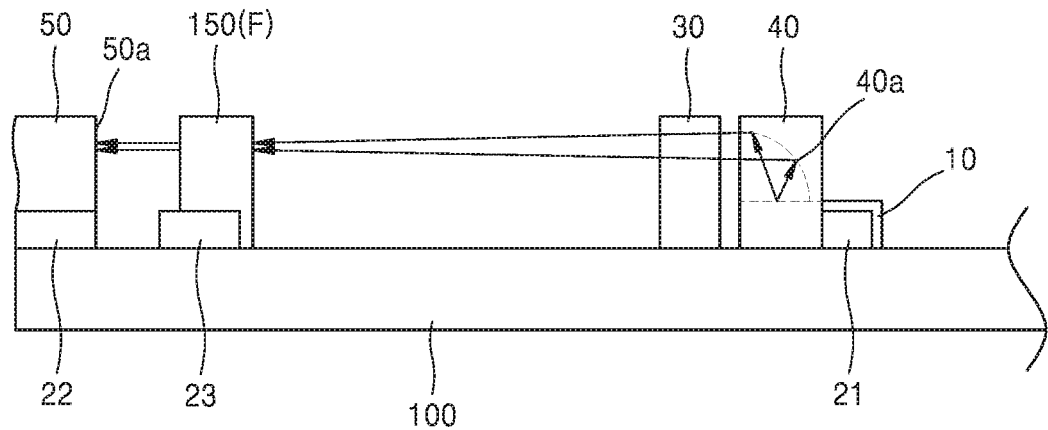
FIG. 3 is a side view illustrating the optical connector shown in FIG. 2.
Figure 4:
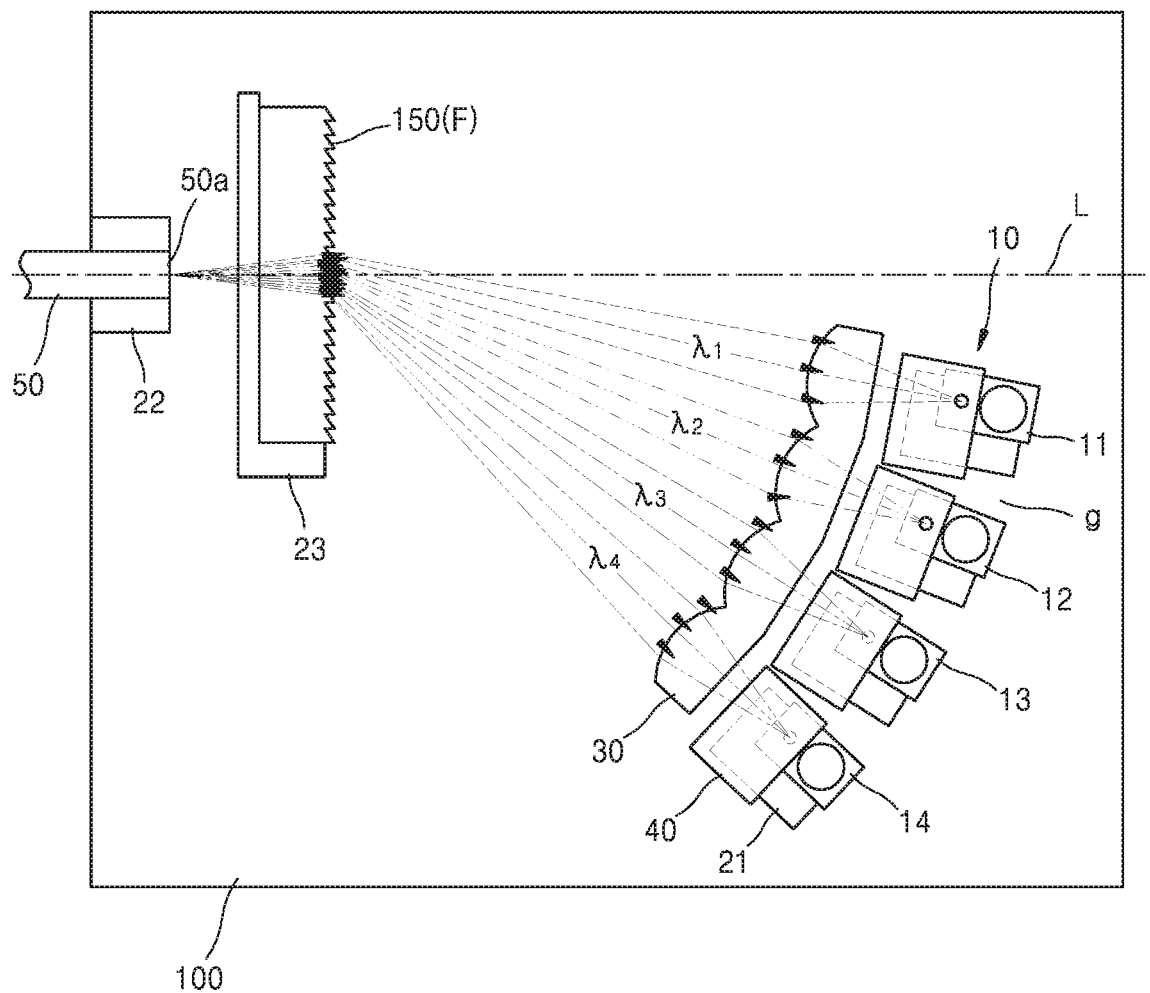
FIG. 4 is a plan view illustrating the optical connector shown in FIG. 1 for describing demultiplexing at a receiving end of a communication channel.
Figure 5:
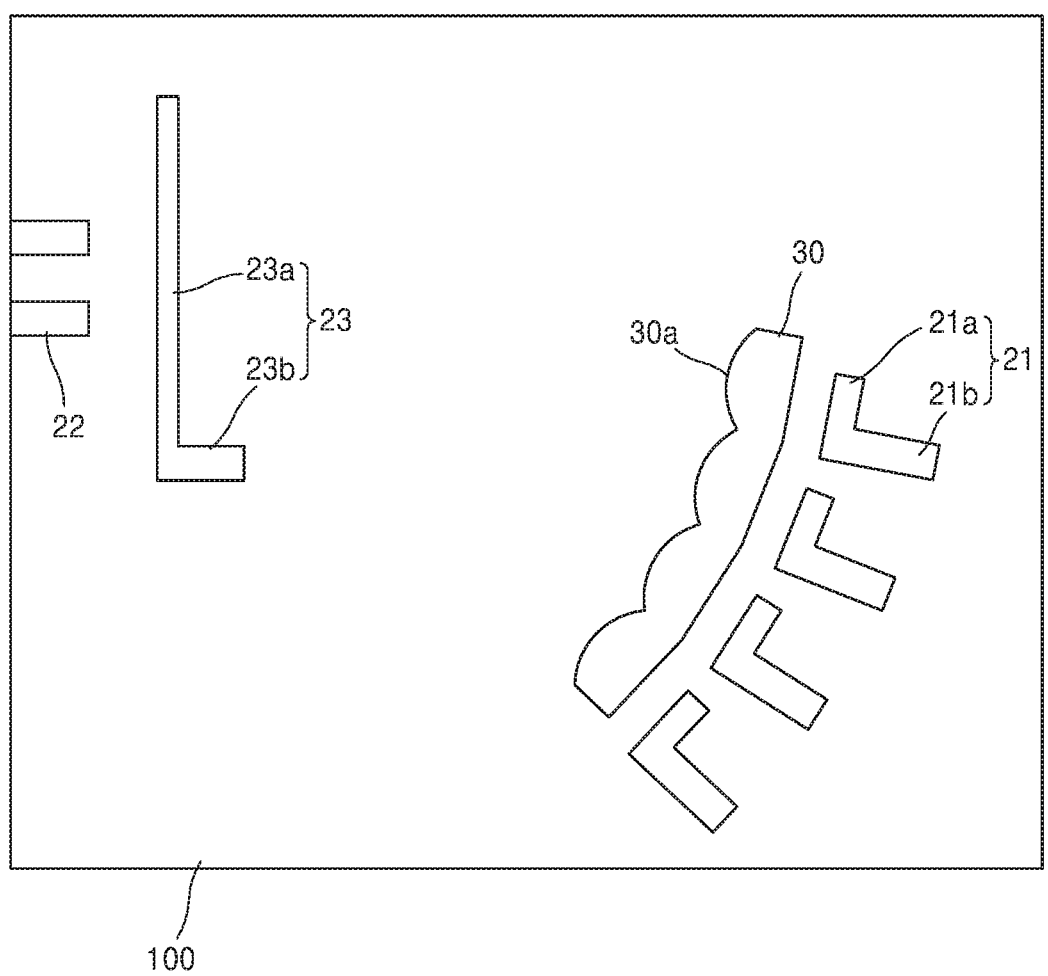
FIGS. 5 and 6 are a plan view and a side view illustrating a portion of the optical connector shown in FIG. 2.
Figure 6:
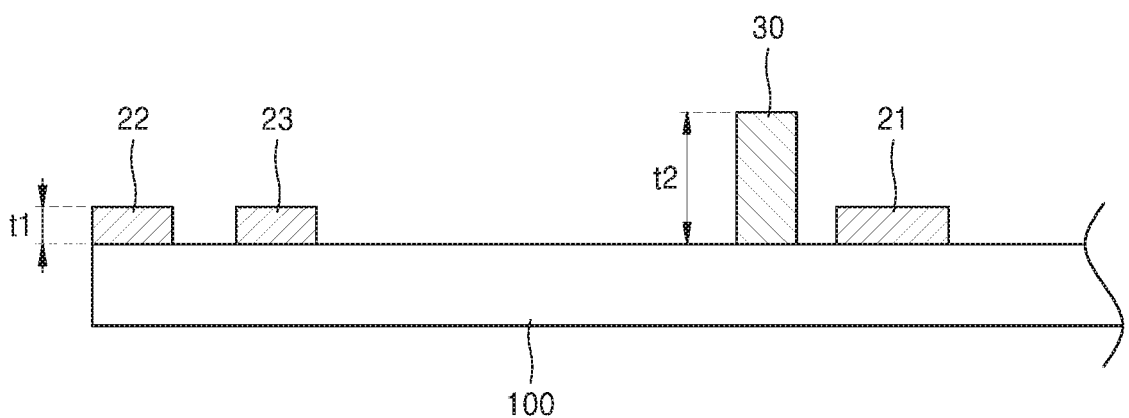
Figure 7:
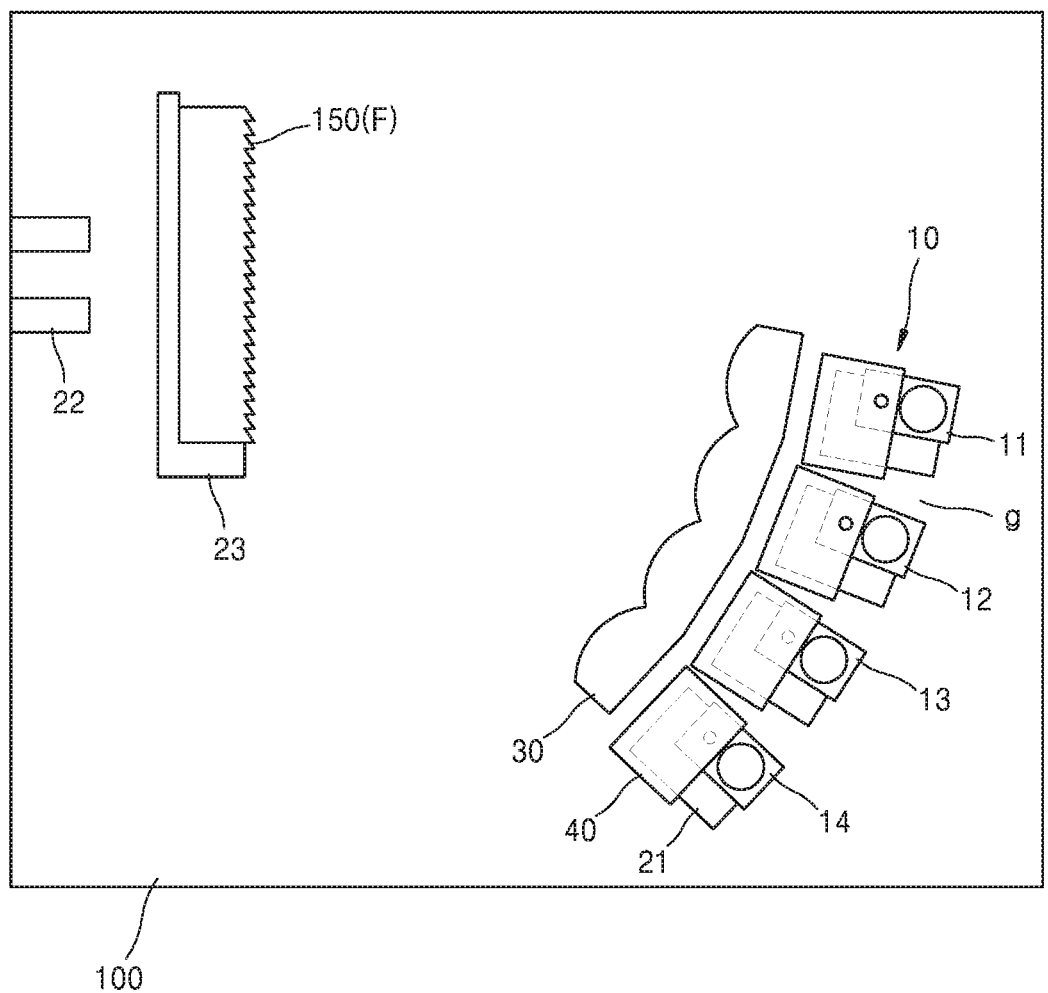
FIGS. 7 and 8 are a plan view and a side view illustrating a portion of the optical connector shown in FIG. 2.
Figure 8:
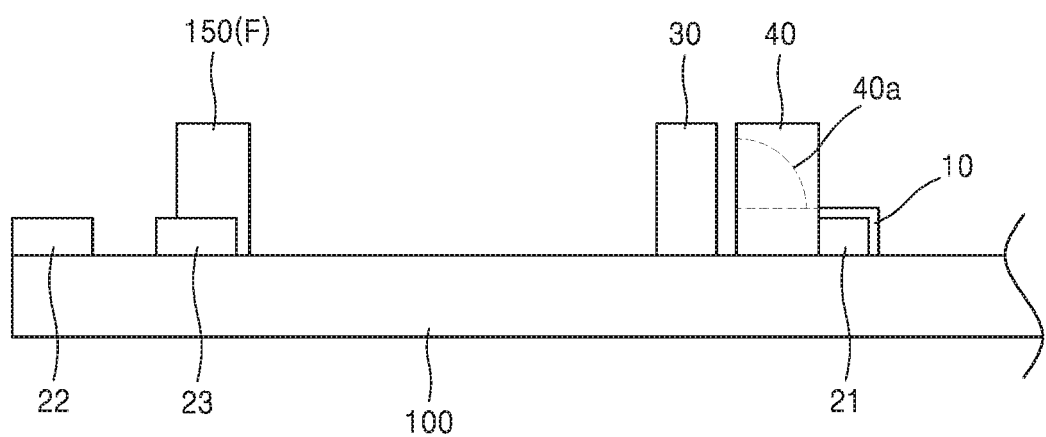

FIG. 1 is an exploded perspective view illustrating an optical connector according to an embodiment. FIG. 2 is a plan view illustrating the optical connector shown in FIG. 1 for describing multiplexing at a transmitting end of a communication channel. FIG. 3 is a side view illustrating the optical connector shown in FIG. 2. FIG. 4 is a plan view illustrating the optical connector shown in FIG. 1 for describing demultiplexing at a receiving end of a communication channel. FIGS. 5 and 6 are a plan view and a side view illustrating a portion of the optical connector shown in FIG. 2. FIGS. 7 and 8 are a plan view and a side view illustrating a portion of the optical connector shown in FIG. 2.

Referring to FIGS. 1 to 8, the optical connector may include: a base substrate 100; an optical fiber 50 arranged above the base substrate 100; at least two optical devices 10 arranged in a curve shape concave toward the optical fiber 50 to surround an end surface 50a of the optical fiber 50 and having different wavelength bands $\lambda 1$, $\lambda 2$, $\lambda 3$, and $\lambda 4$; and an optical path changing device F between the optical fiber 50 and the optical devices 10.

In an embodiment, the optical connector may support wavelength division multiplexing (WDM) optical communication in which various optical signals having different wavelengths are transmitted through a single optical fiber, that is, the optical fiber 50. For example, the optical connector of the present disclosure may provide a plurality of communication channels using the optical fiber 50, wherein, as shown in FIG. 2, the optical connector may operate as a multiplexer at a transmitting end of a communication channel in order to input light, which has different wavelength bands $\lambda 1$, $\lambda 2$, $\lambda 3$, and $\lambda 4$ and is output from a plurality of optical devices such as first to fourth optical devices 11, 12, 13, and 14, to the optical fiber 50 through the optical path changing device F, and as shown in FIG. 4, the optical connector may operate as a demultiplexer at a receiving end of a communication channel in order to input light, which has different wavelength bands $\lambda 1$, $\lambda 2$, $\lambda 3$, and $\lambda 4$ and is output from the optical fiber 50, to a plurality of optical devices such as the first to fourth optical devices 11, 12, 13, and 14 through the optical path changing device F.

In an embodiment, the optical devices 10 may include at least two optical devices, for example, the first to fourth optical devices 11, 12, 13, and 14. The first to fourth optical devices 11, 12, 13, and 14 may respectively include light-emitting devices configured to emit light in different wavelength bands, for example, first to fourth wavelength bands $\lambda 1$, $\lambda 2$, $\lambda 3$, and $\lambda 4$, or may respectively include light-receiving devices configured to receive light in different wavelength bands, for example, first to fourth wavelength bands $\lambda 1$, $\lambda 2$, $\lambda 3$, and $\lambda 4$. According to the wavelength bands $\lambda 1$, $\lambda 2$, $\lambda 3$, and $\lambda 4$ of the first to fourth optical devices 11, 12, 13, and 14 ranging from a first wavelength band $\lambda 1$ having the shortest wavelength to a fourth wavelength band $\lambda 4$ having the longest wavelength, the first to fourth optical devices 11, 12, 13, and 14 may be sequentially arranged to form channels sequentially from a channel having the shortest wavelength to a channel having the longest wavelength.

The optical paths of the first to fourth optical devices 11, 12, 13, and 14 may converge on the end surface 50a of the optical fiber 50, and the first to fourth optical devices 11, 12, 13, and 14 may be concentratively arranged at offset positions on one of left and right sides of an optical axis line L perpendicular to the end surface 50a of the optical fiber 50. That is, the first to fourth optical devices 11, 12, 13, and 14 may not be distributed to both sides, that is, the left and right sides of the optical axis line L, but may be concentratively arranged on one of the left and right sides of the optical axis line L. The arrangement of the first to fourth optical devices 11, 12, 13, and 14 may be called "asymmetric arrangement" with respect to the optical axis line L of the optical fiber 50.

The optical path changing device F may be between the optical fiber 50 and the first to fourth optical devices 11, 12, 13, and 14. The optical path changing device F between the optical fiber 50 and the optical devices 10 may include a diffraction grating 150 configured to diffract incident light at different angles according to the wavelength bands $\lambda 1$, $\lambda 2$, $\lambda 3$, and $\lambda 4$ of the incident light. In this case, the diffraction grating 150 may have an asymmetric grating pattern, and the first to fourth optical devices 11, 12, 13, and 14 may be asymmetrically arranged with respect to the optical axis line L of the optical fiber 50 such that light corresponding to an order of diffraction having the highest light intensity may be incident on the diffraction grating 150 at an oblique angle and may then be incident on the optical fiber 50.

The first to fourth optical devices 11, 12, 13, and 14 may be arranged in a curve shape concave toward the end surface 50a of the optical fiber 50 to surround the end surface 50a of the optical fiber 50. As shown in FIG. 2, the first to fourth optical devices 11, 12, 13, and 14 may be arranged to surround the end surface 50a of the optical fiber 50 such that the optical paths of the first to fourth optical devices 11, 12, 13, and 14 may converge in reverse radial directions toward a region of the diffraction grating 150 facing the optical fiber 50. In addition, as shown in FIG. 4, the first to fourth optical devices 11, 12, 13, and 14 may be arranged to surround the end surface 50a of the optical fiber 50 such that the optical paths of the first to fourth optical devices 11, 12, 13, and 14 may diverge in radial directions from the region of the diffraction grating 150 facing the optical fiber 50.

The expression "the first to fourth optical devices 11, 12, 13 and 14 are arranged to surround the end surface 50a of the optical fiber 50" may mean that the first to fourth optical devices 11, 12, 13, and 14 are arranged in a curve shape which is concave toward the end surface 50a of the optical fiber 50 but the expression is not limited to the arrangement in which the first to fourth optical devices 11, 12, 13, and 14 are arranged in a circular arc shape centered on the end surface 50a of the optical fiber 50. For example, the expression may mean that the first to fourth optical devices 11, 12, 13, and 14 are arranged not along a straight line but along a curve concave toward the optical fiber 50 such that the optical axes of the first to fourth optical devices 11, 12, 13, and 14 may converge to a region of the diffraction grating 150.

The first to fourth optical devices 11, 12, 13, and 14 may be arranged on a flat surface of the base substrate 100. That is, all the first to fourth optical devices 11, 12, 13, and 14 may be arranged together on one flat surface of the base substrate 100 and may directly rest on the base substrate 100 at the same level. In addition, a gap (g) may be formed between neighboring optical devices 10 of the first to fourth optical devices 11, 12, 13, and 14. For example, gaps (g) may be respectively formed between the first and second optical devices 11 and 12 neighboring each other, the second and third optical devices 12 and 13 neighboring to each other, and the third and fourth optical devices 13 and 14 neighboring each other.

As shown in FIG. 2, light having first to fourth wavelength bands $\lambda 1$, $\lambda 2$, $\lambda 3$, and $\lambda 4$ and emitted from the first to fourth optical devices 11, 12, 13, and 14 is incident on the optical fiber 50 such that optical signals may be transmitted via different wavelength bands, that is, the first to fourth wavelength bands $\lambda 1$, $\lambda 2$, $\lambda 3$, and $\lambda 4$, through a single optical fiber, that is, the optical fiber 50. In addition, as shown in FIG. 4, light having first to fourth wavelength bands λ1, λ2, λ3, and λ4 and output from the optical fiber 50 is input to different optical devices, that is, the first to fourth optical devices 11, 12, 13, and 14 such that optical signals may be received in different wavelength bands, that is, the first to fourth wavelength bands λ1, λ2, λ3, and λ4, through a single optical fiber, that is, the optical fiber 50. In this case, since the first to fourth optical devices 11, 12, 13, and 14 are arranged on one flat surface of the base substrate 100 with sufficient gaps (g) therebetween, it is possible to simplify the arrangement of the first to fourth optical devices 11, 12, 13, and 13 for transmitting or receiving different optical signals in a multiplexing or demultiplexing structure in which a plurality of communication channels are provided using a single optical fiber, that is, the optical fiber 50, and possible to easily arrange the first to fourth optical devices 11, 12, 13, and 14.

In a comparative example (not shown) for comparison with the present disclosure, a condensing lens (not shown) having a plurality of lens regions corresponding to the optical devices 10 is between the optical fiber 50 and the optical devices 10, and the optical devices 10 are densely arranged around the optical axis of the condense lens, to realize a multiplexing and demultiplexing structure in which a plurality of communication channels are provided using a single optical fiber, that is, the optical fiber 50. In the comparative example, since the optical devices 10 are densely arranged around the optical axis of the condensing lens (not shown), sufficient gaps (g) are not guaranteed between the optical devices 10, and thus it is not easy to arrange the optical devices 10 and optically align the optical devices 10 with the condensing lens (not shown). In addition, it may be required to arrange the optical devices 10 in a matrix form along different columns and rows to symmetrically arrange the optical devices 10 around the optical axis of the condensing lens (not shown), and for this two-dimensional arrangement of the optical devices 10, additional supporting structures may be required between the optical devices 10. That is, in the comparative example, supporting structures may be required in the height direction of the base substrate 100 unlike in the arrangement structure of the present disclosure in which all the optical devices 10 are arranged together on the flat surface of the base substrate 100.

In the present disclosure, all the optical devices 10 are arranged on the flat surface of the base substrate 100 with the sufficient gaps (g) therebetween, and thus the number of communication channels may be easily increased in the multiplexing or demultiplexing structure in which a plurality of communication channels are formed using the optical fiber 50. For example, the number of communication channels may be increased as desired without structural limitations by increasing the number of optical devices 10 arranged on the base substrate 100.

The first to fourth optical devices 11, 12, 13, and 14 are arranged sequentially from a first position closest to the optical axis line L of the optical fiber 50 to a fourth position farthest from the optical axis line L of the optical fiber 50. The optical axis line L of the optical fiber 50 may be an imaginary line extending in a direction perpendicular to the end surface 50*a* of the optical fiber 50. The first optical device 11 placed at the first position closest to the optical axis line L of the optical fiber 50 may emit or receive light having the first wavelength band λ1, which is the shortest wavelength band among the first to fourth wavelength bands λ1, λ2, λ3, and λ4. The fourth optical device 14 placed at the fourth position farthest from the optical axis line L may emit or receive light having the fourth wavelength band λ4, which is the longest wavelength band among the first to fourth wavelength bands λ1, λ2, λ3, and λ4.

The diffraction grating 150 may be between the optical fiber 50 and the optical devices 10 as an example of the optical path changing device F. In an embodiment, the diffraction grating 150 may be of a transmissive type, and the optical devices 10 and the optical fiber 50 may be at opposite sides of the diffraction grating 150.

The diffraction grating 150 may change the optical path of incident light by different diffraction angles according to the first to fourth wavelength bands λ1, λ2, λ3, and λ4 of the incident light. As shown in FIG. 2, the first to fourth optical devices 11, 12, 13, and 14 may function as light-emitting devices which emit light in different wavelength bands, that is, first to fourth wavelength bands λ1, λ2, λ3, and λ4. In this case, light having the first wavelength band λ1, that is, the shortest wavelength band, and emitted from the first optical device 11 closest to the optical axis line L of the optical fiber 50 may be diffracted by the smallest angle in a direction close to the optical axis line L of the optical fiber 50 (or in a direction almost parallel to the optical axis line L) as passing through the diffraction grating 150, and then the light may be incident on the end surface 50*a* of the optical fiber 50. Unlike this, light having the fourth wavelength band λ4, that is, the longest wavelength band, and emitted from the fourth optical device 14 farthest from the optical axis line L of the optical fiber 50 may be diffracted by the largest angle in a direction close to the optical axis line L of the optical fiber 50 (or in a direction almost parallel to the optical axis line L) as passing through the diffraction grating 150, and then the light may be incident on the end surface 50*a* of the optical fiber 50.

Light having the first to fourth wavelength bands λ1, λ2, λ3, and λ4 and emitted in reverse radial directions from the first to fourth optical devices 11, 12, 13, and 14 surrounding the end surface 50*a* of the optical fiber 50 may be incident on the diffraction grating 150 in different directions, and then the diffraction grating 150 may diffract the light in directions perpendicular to or nearly perpendicular to the end surface 50*a* of the optical fiber 50 such that the light having the first to fourth wavelength bands λ1, λ2, λ3, and λ4 and incident on the diffraction grating 150 in different directions may exit the diffraction grating 150 in directions perpendicular to or nearly perpendicular to the end surface 50*a* of the optical fiber 50.

The diffraction grating 150 may differently diffract light having the first to fourth wavelength bands λ1, λ2, λ3, and λ4 such that the light having the first to fourth wavelength bands λ1, λ2, λ3, and λ4 and incident on the diffraction grating 150 in different directions may be diffracted by different angles in directions perpendicular to or nearly perpendicular to the end surface 50*a* of the optical fiber 50.

The diffraction grating 150 may diffract incident light by different angles according to the wavelength bands of the incident light, that is, according to the first to fourth wavelength bands λ1, λ2, λ3, and λ4. For example, light having the first wavelength band λ1, which is a relatively short wavelength band, may be diffracted by a relatively small angle, and light having the fourth wavelength band λ4, which is a relatively long wavelength band, may be diffracted by a relatively large angle.

Light having the first to fourth wavelength bands λ1, λ2, λ3, and λ4 and incident on an entrance side of the diffraction grating 150 from the first to fourth optical devices 11, 12, 13, and 14 has a relatively large incidence angle distribution, but when the light is output through an exit side of the diffraction grating 150, since the light has been diffracted by different angles by the diffraction grating 150, the light may be condensed to a relatively small exit angle distribution in a direction perpendicular to or nearly perpendicular to the end surface 50a of the optical fiber 50.

Referring to FIG. 4, the first to fourth optical devices 11, 12, 13, and 14 may function as light-receiving devices that receive light having different wavelength bands, that is, the first to fourth wavelength bands λ1, λ2, λ3, and λ4. In this case, the light having the first to fourth wavelength bands λ1, λ2, λ3, and λ4 may be output from the end surface 50a of the optical fiber 50 in a direction perpendicular to or nearly perpendicular to the end surface 50a of the optical fiber 50, and light having the shortest wavelength band, that is, the first wavelength band λ1, may be diffracted by the smallest angle by the diffraction grating 150 and input to the first optical device 11 closest to the optical axis line L of the optical fiber 50 while light having the longest wavelength band, that is, the fourth wavelength band λ4, is diffracted by the largest angle by the diffraction grating 150 and input to the fourth optical device 14 farthest from the optical axis line L of the optical fiber 50. Light having the first to fourth wavelength bands λ1, λ2, λ3, and λ4 and output through the optical fiber 50 may be diffracted in different directions by the diffraction grating 150 such that the light having the first to fourth wavelength bands λ1, λ2, λ3, and λ4 may be radially output toward the first to fourth optical devices 11, 12, 13, and 14 surrounding the end surface 50a of the optical fiber 50.

Although light having the first to fourth wavelength bands λ1, λ2, λ3, and λ4 and output from the optical fiber 50 toward the entrance side of the diffraction grating 150 is in a condensed state in a direction perpendicular to or nearly perpendicular to the end surface 50a of the optical fiber 50, the light having the first to fourth wavelength bands λ1, λ2, λ3, and λ4 may be diffracted by different angles as passing through the diffraction grating 150 and may be output through the exit side of the diffraction grating 150 in a diverged state with a relatively large exit angle distribution in radial directions toward the first to fourth optical devices 11, 12, 13, and 14 surrounding the end surface 50a of the optical fiber 50.

As described above, light having the first to fourth wavelength bands λ1, λ2, λ3, and λ4 may be diffracted by different angles as passing through the diffraction grating 150, and thus the propagation direction of the light may be changed to a direction approaching the optical axis line L of the optical fiber 50 (to a direction nearly parallel to the optical axis line L) (refer to FIG. 2) or may be changed to a direction away from the optical axis line L of the optical fiber 50 (refer to FIG. 4). In addition, since the diffraction grating 150 diffracts light having the first to fourth wavelength bands λ1, λ2, λ3, and λ4 by different angles, the light may have a relatively large angular deviation at one of the entrance and exit sides of the diffraction grating 150 and may have a relatively small angular deviation at the other of the entrance and exit sides of the diffraction grating 150.

Referring to FIGS. 1 and 5, the optical devices 10 and the optical fiber 50 may be arranged on the base substrate 100 and may be optically aligned with each other. The positions of the optical devices 10 may be determined by first alignment guides 21 provided on the base substrate 100. The first alignment guides 21 may align the positions of the optical devices 10 while making contact with different surfaces of the optical devices 10. For example, the first alignment guides 21 may each include first and second ribs 21a and 21b extending in directions perpendicular to each other to surround corners of the optical devices 10.

The optical devices 10 may include the first to fourth optical devices 11, 12, 13, and 14 having the first to fourth wavelength bands λ1, λ2, λ3, and λ4 that are different from each other. The positions of the first to fourth optical devices 11, 12, 13, and 14 may be respectively aligned by the first alignment guides 21, and the first alignment guides 21 determining the positions of the first to fourth optical devices 11, 12, 13, and 14 may be arranged in a curve shape which is concave toward the end surface 50a of the optical fiber 50 to surround the end surface 50a of the optical fiber 50. For example, the first ribs 21a of the first alignment guides 21 may be arranged in a curve shape surrounding the end surface 50a of the optical fiber 50, and the second ribs 21b of the first alignment guides 21 may be radially arranged around the end surface 50a of the optical fiber 50.

The position of the optical fiber 50 may be determined by a second alignment guide 22. The second alignment guide 22 may include a pair of ribs forming a groove such that the optical fiber 50 may be inserted in the groove.

The diffraction grating 150 is placed on an optical path between the optical fiber 50 and the optical devices 10 as an example of the optical path changing device F, and the position of the diffraction grating 150 may be determined by a third alignment guide 23. The third alignment guide 23 may include first and second ribs 23a and 23b extending in directions perpendicular to each other to surround a corner of the diffraction grating 150. The first rib 23a of the third alignment guide 23 may face the end surface 50a of the optical fiber 50, and the second rib 23b of the third alignment guide 23 may extend in a direction perpendicular to the end surface 50a of the optical fiber 50.

Referring to FIGS. 5 and 6, the first to third alignment guides 21, 22, and 23 may be formed as a pattern on the base substrate 100 through a semiconductor process such as a photolithography process. For example, the first to third alignment guides 21, 22, and 23 may be formed by selectively etching a polymer layer formed on the base substrate 100. The first to third alignment guides 21, 22, and 23 may be formed at a time through a patterning process. For example, the first to third alignment guides 21, 22, and 23 may be formed at a time by applying a first polymer to the base substrate 100 to a first thickness t1 and selectively etching the first polymer. Therefore, the first to third alignment guides 21, 22, and 23 may include the same material, that is, the first polymer.

Referring to FIG. 1, a collimator 30 may be provided between the optical fiber 50 and the optical devices 10. Light emitted from the first to fourth optical devices 11, 12, 13, and 14 may be collimated as a spot-shaped light beam by the collimator 30 such that the light beam may be converged on a region of the diffraction grating 150. The collimator 30 may include different lens regions 30a respectively placed on the optical paths of the first to fourth optical devices 11, 12, 13, and 14.

Referring to FIGS. 5 and 6, the collimator 30 may be provided on the base substrate 100 and may include a second polymer that is different from the first polymer included in first to third alignment guides 21, 22, and 23. For example, the collimator 30 may be formed as a pattern on the base substrate 100 through a semiconductor process such as a photolithography process. For example, the collimator 30 may be formed by selectively etching a polymer layer formed on the base substrate 100. For example, the first to third alignment guides 21, 22, and 23 may be formed by applying the first polymer to the base substrate 100 to the first thickness t1 and selectively etching the first polymer, and then the collimator 30 may be formed by applying the second polymer to a second thickness t2 and selectively etching the second polymer. In this case, the first and second polymers may be different from each other such that the first and second polymers may react with different etchants, and the first to third alignment guides 21, 22, and 23, and the collimator 30 may respectively include the first and second polymers. All the first to third alignment guides 21, 22, and 23, and the collimator 30 may be formed above the base substrate 100, for example, directly on the base substrate 100 by patterning first and second polymer layers formed on the base substrate 100.

Referring to FIGS. 7 and 8, reflecting mirrors 40a may be provided on the optical paths of the optical devices 10. The reflecting mirrors 40a may be arranged on the base substrate 100 to cover the optical devices 10 and may be provided by forming the reflecting mirrors 40a on portions of injection molded parts 40. For example, the reflecting mirrors 40a may be formed on the injection molded parts 40 as a molten resin injected into a mold (not shown) is solidified, and the injection molded parts 40 on which the reflecting mirrors 40a are formed may be arranged on the base substrate 100 to cover the optical devices 10, wherein the reflecting mirrors 40a may be formed on inner sides of the injection molded parts 40 to face the optical devices 10. For example, the reflecting mirrors 40a may be formed as ellipsoid mirrors and may be arranged such that light-emitting regions or light-receiving regions of the optical devices 10 may be on focal points of the ellipsoid mirrors.

Hereinafter, an optical connector will be described according to another embodiment.

Figure 9:
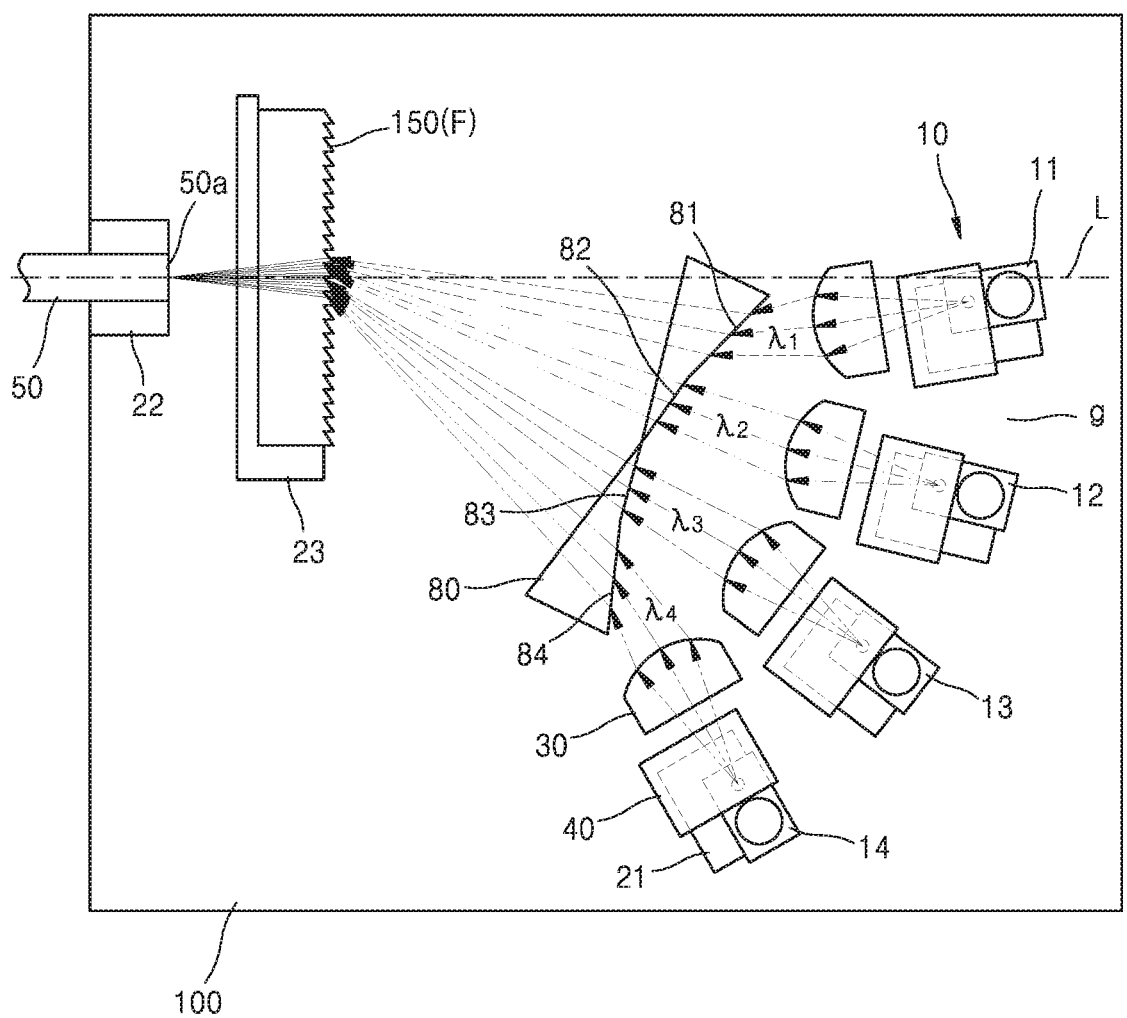
FIG. 9 is a plan view illustrating an optical connector according to another embodiment for describing multiplexing at a transmitting end of a communication channel.
Figure 10:
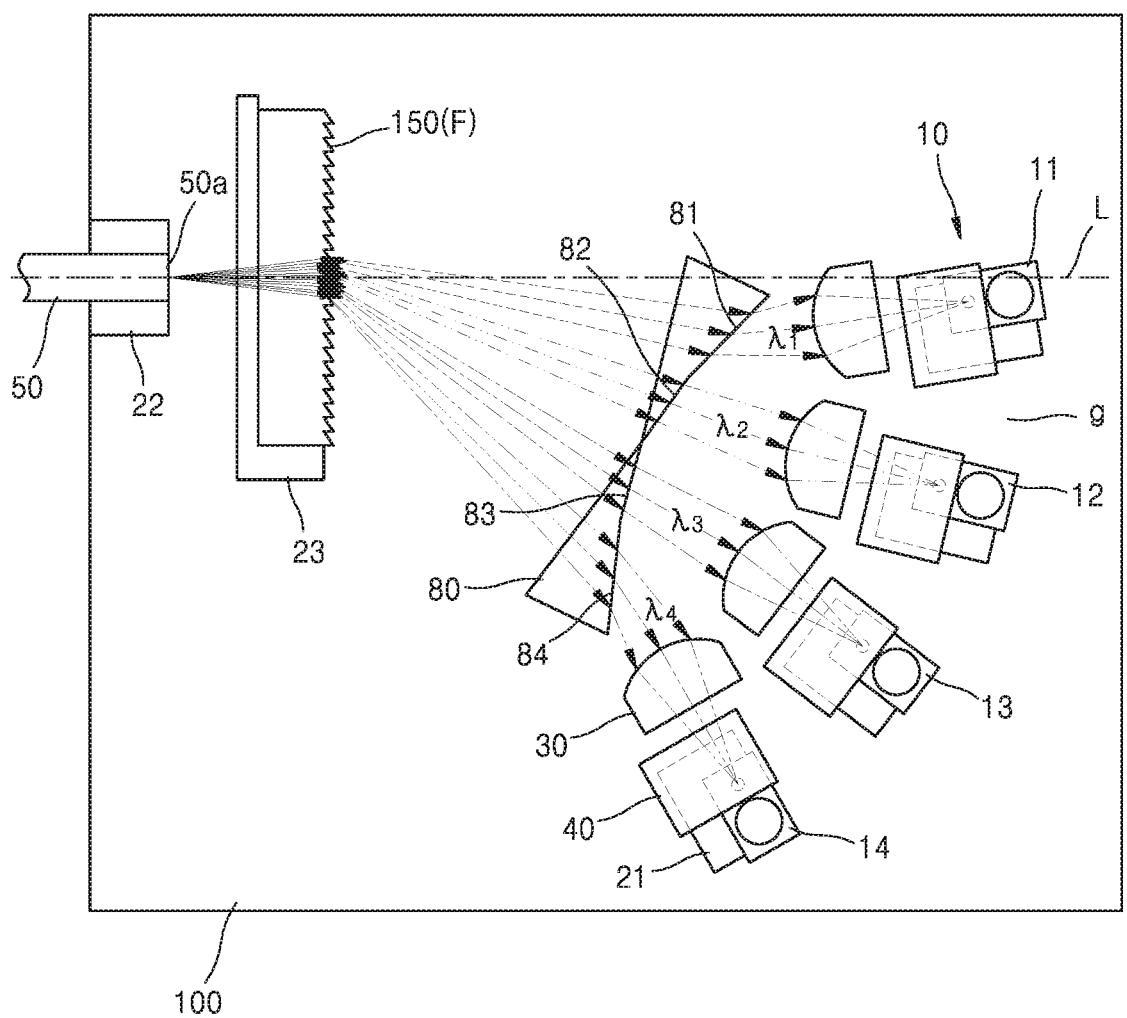
FIG. 10 is a plan view illustrating the optical connector of the other embodiment for describing demultiplexing at a receiving end of a communication channel.
Figure 11:
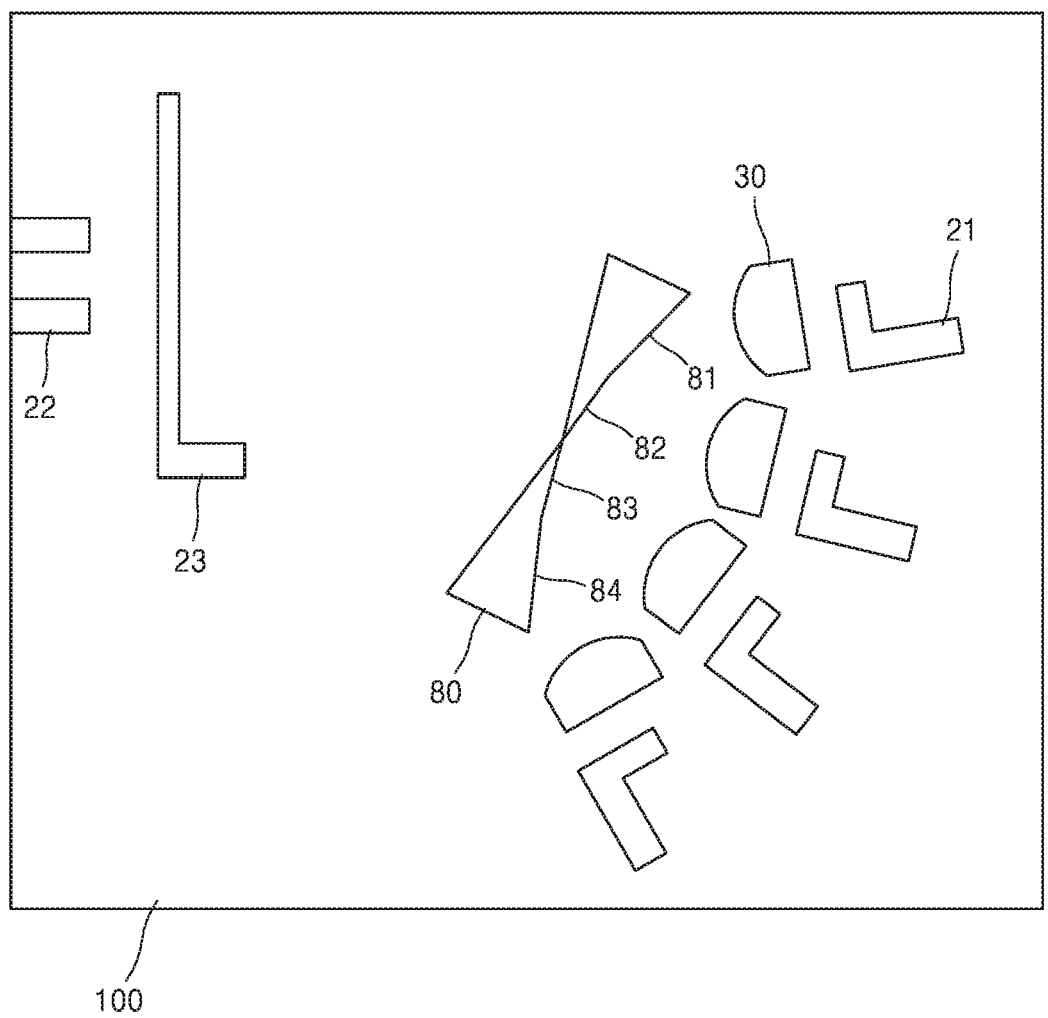
FIGS. 11 and 12 are a plan view and a side view illustrating a portion of the optical connector shown in FIG. 9.
Figure 12:
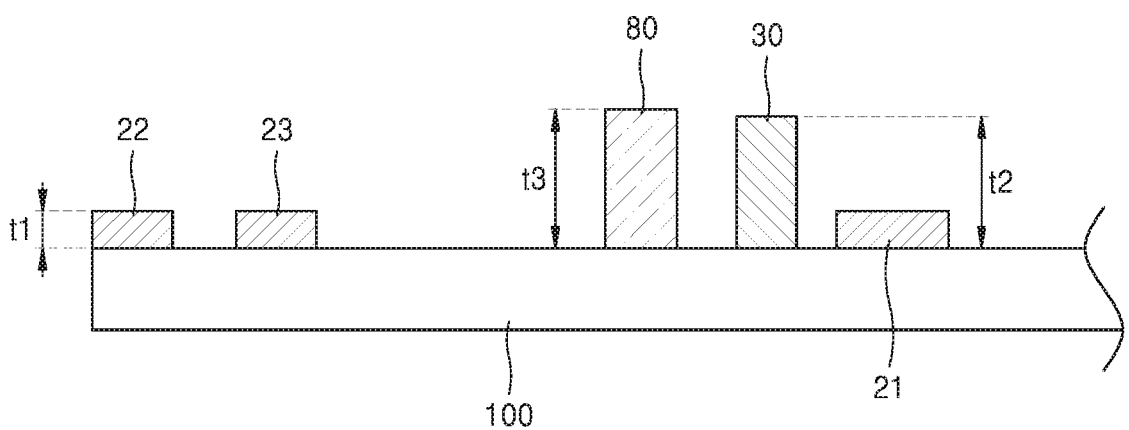

FIG. 9 is a plan view illustrating an optical connector according to another embodiment for describing multiplexing at a transmitting end of a communication channel. FIG. 10 is a plan view illustrating the optical connector of the other embodiment for describing demultiplexing at a receiving end of a communication channel. FIGS. 11 and 12 are a plan view and a side view illustrating a portion of the optical connector shown in FIG. 9.

In an embodiment, a polyhedron prism 80 may be between a diffraction grating 150 and a plurality of optical devices 10 such as first to fourth optical devices 11, 12, 13, and 14. The polyhedron prism 80 may provide different refracting surfaces, for example, first to fourth refracting surfaces 81, 82, 83, and 84 having different angles in the optical paths of the first to fourth optical devices 11, 12, 13, and 14, and the polyhedron prism 80 may have a concave polygonal entrance or exit surface including the first to fourth refracting surfaces 81, 82, 83, and 84 at different angles.

In an embodiment, the first to fourth optical devices 11, 12, 13, and 14 may include first to fourth optical devices 11, 12, 13, and 14, and the optical paths of the first to fourth optical devices 11, 12, 13, and 14 may be changed by different angles by the first to fourth refracting surfaces 81, 82, 83, and 84 having different angles. In this case, the first and fourth refracting surfaces 81 and 84 located at peripheral positions among the first to fourth refracting surfaces 81, 82, 83, and 84 may have relatively large angles with respect to planes perpendicular to optical axes of incident light such that the optical paths of the first and fourth optical devices 11 and 14 may be changed by relatively large angles by the first and fourth refracting surfaces 81 and 84. Unlike this, the second and third refracting surfaces 82 and 83 located at central positions may have relatively small angles with respect to planes perpendicular to optical axes of incident light such that the optical paths of the second and third optical devices 12 and 13 may be changed by relatively small angles by the second and third refracting surfaces 82 and 83.

The optical paths of the first to fourth optical devices 11, 12, 13, and 14 may have relatively large angular deviations at one of entrance and exit sides of the polyhedron prism 80 and relatively small angular deviations at the other of the entrance and exit sides of the polyhedron prism 80.

As shown in FIG. 9, the first to fourth optical devices 11, 12, 13, and 14 may function as light-emitting devices, and in this case, the polyhedron prism 80 may provide the first to fourth refracting surfaces 81, 82, 83, and 84 at different incident positions and angles for light emitted in reverse radial directions from the first to fourth optical devices 11, 12, 13, and 14 surrounding an end surface 50a of an optical fiber 50 such that the light emitted from the first to fourth optical devices 11, 12, 13, and 14 may be refracted by different angles. The light emitted from the first to fourth optical devices 11, 12, 13, and 14 may be incident on the first to fourth refracting surfaces 81, 82, 83, and 84 at different incident positions and angles and may then be refracted by different angles. For example, the first to fourth refracting surfaces 81, 82, 83, and 84 of the polyhedron prism 80 may form incident surfaces of the polyhedron prism 80, which have an overall concave polygonal shape. For example, the first and fourth refracting surfaces 81 and 84 located at peripheral positions among the first to fourth refracting surfaces 81, 82, 83, and 84 may have relatively large angles with respect to planes perpendicular to optical axes of incident light, and the second and third refracting surfaces 82 and 83 located at central positions have relatively small angles with respect to planes perpendicular to optical axes of incident light. As described above, since the first and fourth refracting surfaces 81 and 84 located at peripheral positions have relatively large angles and the second and third refracting surfaces 82 and 83 located at central positions have relatively small angles, light emitted from the first and fourth optical devices 11 and 14 located at peripheral positions may be refracted by relatively large angles by the first and fourth refracting surfaces 81 and 84, and light emitted from the second and third optical devices 12 and 13 located at central positions may be refracted by relatively small angles by the second and third refracting surfaces 82 and 83, thereby making it possible to refract light emitted from the first to fourth optical devices 11, 12, 13, and 14 in mutually approaching directions with decreasing angular deviations. That is, light emitted in reverse radial directions from the first to fourth optical devices 11, 12, 13, and 14 may have relatively large incidence angle deviations with respect to the polyhedron prism 80 but may have relatively small exit angle deviations with respect to the polyhedron prism 80.

The polyhedron prism 80 may reduce the angular deviations of light emitted in reverse radial directions from the first to fourth optical devices 11, 12, 13, and 14 arranged in a curved shape and may thus change the optical paths of the light in mutually approaching directions with reduced angular deviations. In the present embodiment, the polyhedron prism 80 is between the diffraction grating 150 and the first to fourth optical devices 11, 12, 13, and 14, and thus sufficient gaps (g) may be guaranteed between the first to fourth optical devices 11, 12, 13, and 14. For example, the polyhedron prism 80 may increase the gaps (g) between the first to fourth optical devices 11, 12, 13, and 14, and although the optical paths of light emitted in reverse radial directions from the first to fourth optical devices 11, 12, 13, and 14 have large angular deviations because of the increased gaps (g) between the first to fourth optical devices 11, 12, 13, and 14, the polyhedron prism 80 changes the optical paths of the light emitted from the first to fourth optical devices 11, 12, 13, and 14 to approach each other with less angular deviations such that the light may be incident on the end surface 50a of the optical fiber 50 in a direction perpendicular to or nearly perpendicular to the end surface 50a of the optical fiber 50 after passing through the diffraction grating 150.

The first to fourth optical devices 11, 12, 13, and 14 may be asymmetrically arranged with respect to an optical axis line L of the optical fiber 50. However, unlike in the embodiment shown in FIG. 2, the first to fourth optical devices 11, 12, 13, and 14 may be arranged not only at offset positions on one of left and right sides of the optical axis line L of the optical fiber 50 but also at positions distributed to both the left and right sides of the optical axis line L of the optical fiber 50. For example, the first to fourth optical devices 11, 12, 13, and 14 may be mainly arranged on one side of the optical axis line L with some of the first to fourth optical devices 11, 12, 13, and 14 being arranged on the other side of the optical axis line L, and since the polyhedron prism 80 is used as described above in the present embodiment, the area of a base substrate 100 may be used more efficiently and more widely to guarantee sufficient gaps (g) between the first to fourth optical devices 11, 12, 13, and 14. In addition, a collimator 30 may be between the polyhedron prism 80 and the first to fourth optical devices 11, 12, 13, and 14. Light emitted from the first to fourth optical devices 11, 12, 13, and 14 may be collimated as a spot-shaped light beam by the collimator 30. The collimator 30 may include different collimators 30 respectively placed on the optical paths of the first to fourth optical devices 11, 12, 13, and 14. Unlike in the embodiment shown in FIG. 2, the first to fourth optical devices 11, 12, 13, and 14 are dispersed over a wide area with the gaps (g) therebetween, and thus the collimators 30 may be separately and respectively provided to the first to fourth optical devices 11, 12, 13, and 14.

As shown in FIG. 10, the first to fourth optical devices 11, 12, 13, and 14 may function as light-receiving devices, and in this case, the polyhedron prism 80 may provide the first to fourth refracting surfaces 81, 82, 83, and 84 at different incident positions and angles for light radially output from a region of the diffraction grating 150 facing the optical fiber 50 such that the light may be refracted by different angles and may be incident on the first to fourth optical devices 11, 12, 13, and 14. For example, the first to fourth refracting surfaces 81, 82, 83, and 84 of the polyhedron prism 80 may form exit surfaces of the polyhedron prism 80, which have an overall concave polygonal shape.

The first and fourth refracting surfaces 81 and 84 located at peripheral positions among the first to fourth refracting surfaces 81, 82, 83, and 84 may have relatively large angles with respect to planes perpendicular to optical axes of incident light, and the second and third refracting surfaces 82 and 83 located at central positions may have relatively small angles with respect to planes perpendicular to optical axes of incident light. As described above, since the first and fourth refracting surfaces 81 and 84 of the polyhedron prism 80 located at peripheral positions have relatively large angles and the second and third refracting surfaces 82 and 83 of the polyhedron prism 80 located at central positions have relatively small angles, light refracted by relatively large angles by the first and fourth refracting surfaces 81 and 84 may be incident on the first and fourth optical devices 11 and 14 located at peripheral positions, and light refracted by relatively small angles by the second and third refracting surfaces 82 and 83 may be incident on the second and third optical devices 12 and 13 located at central positions. Light radially output from the diffraction grating 150 may have relatively small incidence angle deviations with respect to the polyhedron prism 80 but may have relatively large exit angle deviations with respect to the polyhedron prism 80. As described above, the polyhedron prism 80 may sufficiently guarantee the gaps (g) between the first to fourth optical devices 11, 12, 13, and 14 by increasing the angular deviations of light radially output from the diffraction grating 150.

Referring to FIGS. 11 and 12, the polyhedron prism 80 may be formed as a pattern on the base substrate 100 through a semiconductor process such as a photolithography process. For example, the polyhedron prism 80 may be formed by selectively etching a polymer layer formed on the base substrate 100.

Together with the polyhedron prism 80, first to third alignment guides 21, 22, and 23 may be provided on the base substrate 100 to align the first to fourth optical devices 11, 12, 13, and 14, the optical fiber 50, and the diffraction grating 150, and the collimator 30 may be provided on the base substrate 100 between the diffraction grating 150 and the first to fourth optical devices 11, 12, 13, and 14.

For example, the first to third alignment guides 21, 22, and 23 may be formed by applying a first polymer to the base substrate 100 to a first thickness t1 and selectively etching the first polymer, and then the collimator 30 may be formed by applying a second polymer to a second thickness t2 and selectively etching the second polymer. Then, the polyhedron prism 80 may be formed by applying a third polymer to a third thickness t3 and selectively etching the third polymer.

In this case, the first to third polymers may be different from each other such that the first to third polymers may react with different etchants, and the first to third alignment guides 21, 22, and 23, the collimator 30, and the polyhedron prism 80 may respectively include the first to third polymers.

All the first to third alignment guides 21, 22, and 23, the collimator 30, and the polyhedron prism 80 may be formed above the base substrate 100, for example, directly on the base substrate 100 by patterning first to third polymer layers formed on the base substrate 100.

Hereinafter, an optical connector will be described according to another embodiment.

Figure 13:
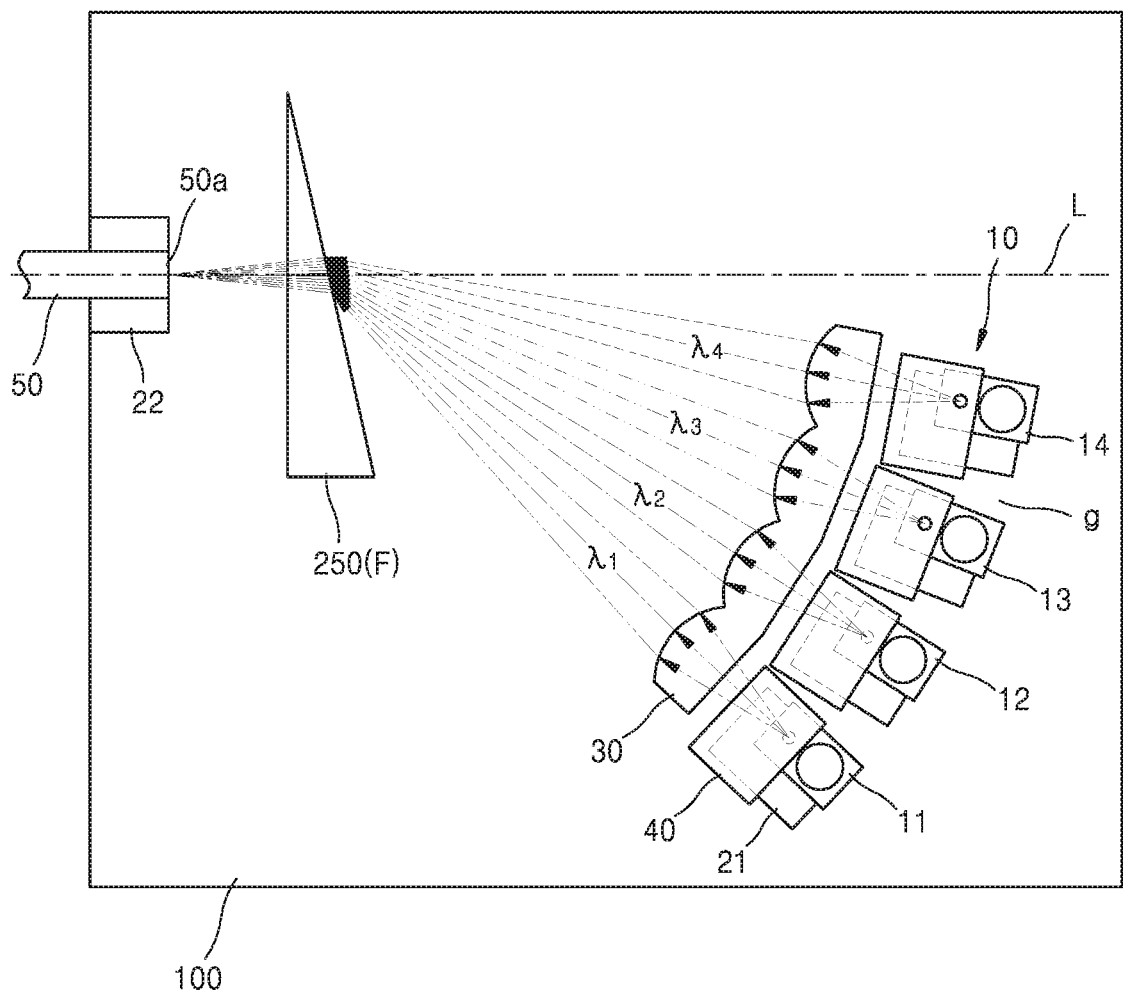
FIG. 13 is a plan view illustrating an optical connector according to another embodiment for describing multiplexing at a transmitting end of a communication channel.
Figure 14:
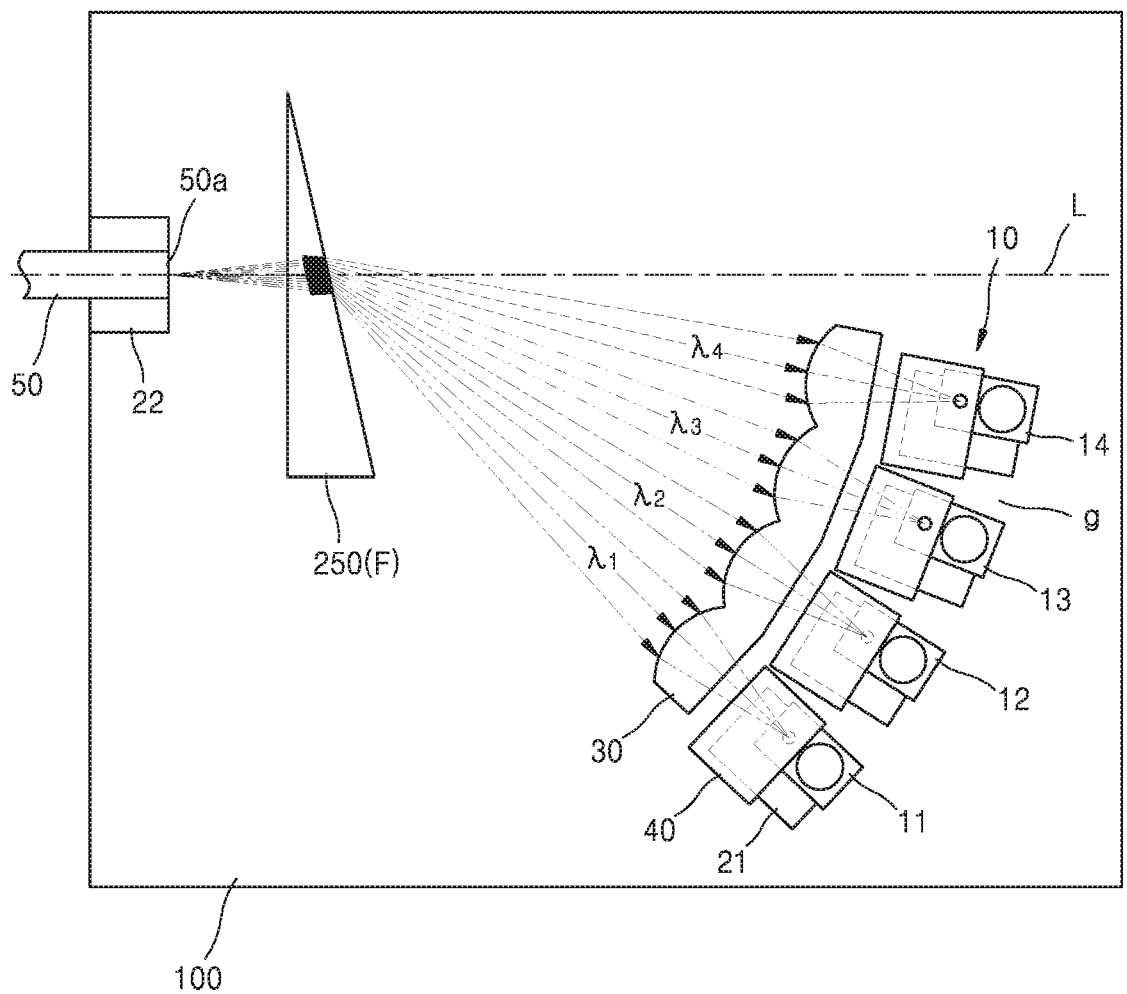
FIG. 14 is a plan view illustrating the optical connector of the other embodiment for describing demultiplexing at a receiving end of a communication channel.
Figure 15:
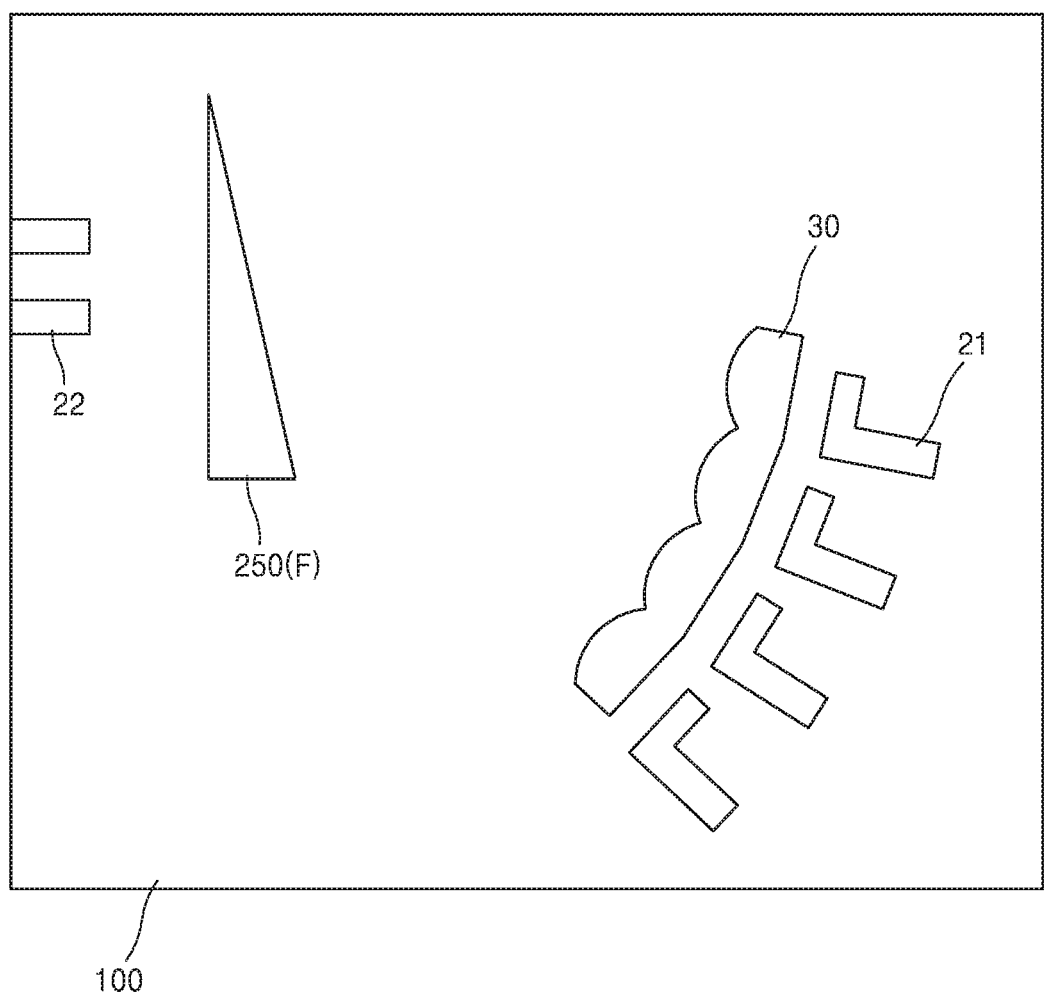
FIGS. 15 and 16 are a plan view and a side view illustrating a portion of the optical connector shown in FIG. 13.
Figure 16:
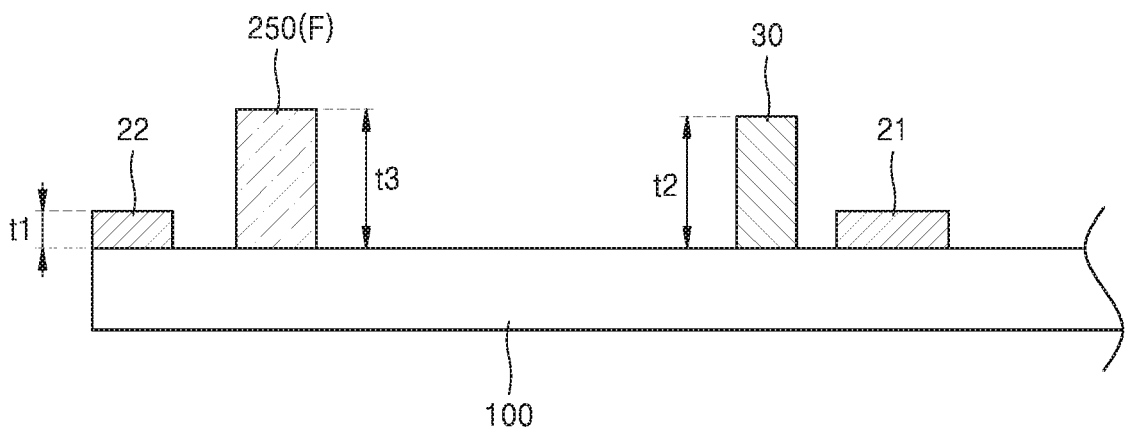

FIG. 13 is a plan view illustrating an optical connector according to another embodiment for describing multiplexing at a transmitting end of a communication channel. FIG. 14 is a plan view illustrating the optical connector of the other embodiment for describing demultiplexing at a receiving end of a communication channel. FIGS. 15 and 16 are a plan view and a side view illustrating a portion of the optical connector shown in FIG. 13.

Referring to FIGS. 13 to 16, the optical connector may include: a base substrate 100; an optical fiber 50 arranged above the base substrate 100; at least two optical devices such as first to fourth optical devices 11, 12, 13, and 14 arranged in a curve shape concave toward an end surface 50a of the optical fiber 50 to surround the end surface 50a of the optical fiber 50 and having different wavelength bands $\lambda 1$, $\lambda 2$, $\lambda 3$, and $\lambda 4$; and an optical path changing device F between the optical fiber 50 and the first to fourth optical devices 11, 12, 13, and 14. In an embodiment, the optical path changing device F may include a prism 250 that refracts incident light at different angles according to the wavelength bands $\lambda 1$, $\lambda 2$, $\lambda 3$, and $\lambda 4$ of the incident light.

The prism 250 may change the optical path of incident light by different diffraction angles according to the wavelength bands λ1, λ2, λ3, and λ4 of the incident light. As shown in FIG. 13, the first to fourth optical devices 11, 12, 13, and 14 may function as light-emitting devices which emit light having different wavelength bands, that is, first to fourth wavelength bands λ1, λ2, λ3, and λ4. In this case, light having the first wavelength band λ1, that is, the shortest wavelength band and emitted from the first optical device 11 farthest from an optical axis line L of the optical fiber 50 may be diffracted by the largest angle in a direction close to the optical axis line L of the optical fiber 50 (or in a direction almost parallel to the optical axis line L) as passing through the prism 250, and may then be incident on the end surface 50a of the optical fiber 50. Unlike this, light having the fourth wavelength band λ4, that is, the longest wavelength band, and emitted from the fourth optical device 14 closest to the optical axis line L of the optical fiber 50 may be diffracted by the smallest angle in a direction close to the optical axis line L of the optical fiber 50 (or in a direction almost parallel to the optical axis line L) as passing through the prism 250, and may then be incident on the end surface 50a of the optical fiber 50.

As shown in FIG. 14, the first to fourth optical devices 11, 12, 13, and 14 may function as light-receiving devices which receive light having different wavelength bands, that is, the first to fourth wavelength bands λ1, λ2, λ3, and λ4. In this case, light having the first to fourth wavelength bands λ1, λ2, λ3, and λ4 may be output from the end surface 50a of the optical fiber 50 in a direction perpendicular to or nearly perpendicular to the end surface 50a of the optical fiber 50, and light having the shortest wavelength band, that is, the wavelength band λ1 may be diffracted by the largest angle by the prism 250 and input to the first optical device 11 farthest from the optical axis line L of the optical fiber 50 while light having the longest wavelength band, that is, the fourth wavelength band λ4 is diffracted by the smallest angle by the prism 250 and input to the fourth optical device 14 closest to the optical axis line L of the optical fiber 50.

The optical connector of the present embodiment may include the prism 250 as an example of the optical path changing device F, and the first to fourth optical devices 11, 12, 13, and 14 may be arranged sequentially from a position closest to the optical axis line L perpendicular to the end surface 50a of the optical fiber 50 to a position farthest from the optical axis line L in the order from the fourth optical device 14 having the longest wavelength to the first optical device 11 having the shortest wavelength. That is, in the present embodiment, the first to fourth optical devices 11, 12, 13, and 14 may be sequentially arranged in the order from the fourth optical device 14 having the longest wavelength to the first optical device 11 having the shortest wavelength according to the distance from the optical axis line L of the optical fiber 50. Unlike in the present embodiment, in the embodiment shown in FIG. 2, the first to fourth optical devices 11, 12, 13, and 14 may be sequentially arranged in the order from the first optical device 11 having the shortest wavelength to the fourth optical device 14 having the longest wavelength according to the distance from the optical axis line L of the optical fiber 50. In the embodiments shown in FIGS. 2 and 13, the arrangement order of the first to fourth optical devices 11, 12, 13, and 14 having different wavelength bands λ1, λ2, λ3, and λ4 may be reversed according to the optical characteristics of the optical path changing device F.

Referring to FIGS. 15 and 16, the prism 250 may be formed as a pattern on the base substrate 100 through a semiconductor process such as a photolithography process. For example, the prism 250 may be formed by selectively etching a polymer layer formed on the base substrate 100. The optical connector of the present embodiment may include the prism 250 as an example of the optical path changing device F and may not include the third alignment guide 23 required to align the diffraction grating 150 in the embodiment shown in FIG. 2 in which the diffraction grating 150 is included as an example of the optical path changing device F, and thus the prism 250 may be directly formed on the base substrate 100 at a position aligned by patterning.

Together with the prism 250, first and second alignment guides 21 and 22 may be provided on the base substrate 100 to align the positions of the first to fourth optical devices 11, 12, 13, and 14, and the optical fiber 50, and a collimator 30 may be provided on the base substrate 100 between the prism 250 and the first to fourth optical devices 11, 12, 13, and 14.

For example, the first and second alignment guides 21 and 22 may be formed by applying a first polymer to the base substrate 100 to a first thickness t1 and selectively etching the first polymer, and then the collimator 30 may be formed by applying a second polymer to a second thickness t2 and selectively etching the second polymer. Then, the prism 250 may be formed by applying a third polymer to a third thickness t3 and etching the third polymer.

In this case, the first to third polymers may be different from each other such that the first to third polymers may react with different etchants, and the first and second alignment guides 21 and 22, the collimator 30, and the prism 250 may respectively include the first to third polymers.

All the first and second alignment guides 21 and 22, the collimator 30, and the prism 250 may be formed above the base substrate 100, for example, directly on the base substrate 100 by patterning first to third polymer layers formed on the base substrate 100.

As described above, according to the one or more of the above embodiments, a plurality of light-emitting or light-receiving devices may be arranged on a single substrate with sufficient gaps between the light-emitting or light-receiving devices, and thus a plurality of optical devices for transmitting or receiving different optical signals may be simply and easily arranged in a multiplexing or demultiplexing structure in which a plurality of communication channels are provided using a single optical fiber.

In the present disclosure, a plurality of optical devices are arranged on one flat surface of a base substrate with sufficient gaps therebetween, and thus the number of communication channels may be easily increased in a multiplexing or demultiplexing structure in which a plurality of communication channels are provided using a single optical fiber. For example, the number of communication channels may be increased as desired without structural limitations by increasing the number of optical devices arranged on the base substrate.

The present disclosure may be applied to optical connectors supporting a plurality of communication channels, and various devices including optical connectors.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An optical connector comprising:
a base substrate;
an optical fiber on the base substrate;
a plurality of optical devices having different wavelength bands and arranged in a curved shape concave toward the optical fiber to surround an end surface of the optical fiber; and
an optical path changing device between the optical fiber and the plurality of optical devices and configured to diffract or refract incident light at different angles according to wavelength bands of the incident light, and
wherein the plurality of optical devices are concentratively arranged at offset positions on selective one side among left and right sides of an optical axis line perpendicular to the end surface of the optical fiber and asymmetrically arranged with respect to the optical axis line,
wherein the plurality of optical devices comprises first to fourth optical devices arranged in a curved shape concave toward the optical fiber to surround an end surface of the optical fiber, and
further comprising a polyhedron prism in optical paths between the first to fourth optical devices and the optical path changing device, the polyhedron prism providing first to fourth refracting surfaces having different angles to refract optical paths of the first to fourth optical devices with different angles from each other, so as to magnify a gap between adjacent optical devices among the first to fourth optical devices arranged in the curved shape on the base substrate, and
wherein the first to fourth refracting surfaces have different angles on a plane parallel to the base substrate on which the first to fourth optical devices are arranged, to refract optical paths of the first to fourth optical devices with different angles on the plane.

2. The optical connector of claim 1, wherein
the plurality of optical devices are configured to output light in reverse radial directions converging on a region of the optical path changing device or configured to receive light diverging from the region of the optical path changing device in radial directions.

3. The optical connector of claim 1, wherein
the optical path changing device comprises a diffraction grating or a prism.

4. The optical connector of claim 3, wherein
the diffraction grating comprises a transmissive diffraction grating, and
the plurality of optical devices and the optical fiber are arranged at opposite sides of the diffraction grating.

5. The optical connector of claim 1, wherein
the plurality of optical devices are arranged along a curve concave toward the end surface of the optical fiber in an order from a shortest wavelength band to a longest wavelength band.

6. The optical connector of claim 1, wherein
the first to fourth optical devices having first to fourth wavelength bands that are different from each other, and
the first to fourth optical devices are arranged along a curve according to the first to fourth wavelength bands of the first to fourth optical devices in an order from the first wavelength band, which is shortest, to the fourth wavelength band, which is longest.

7. The optical connector of claim 1, wherein
the plurality of optical devices are spaced apart from each other with a gap between neighboring optical devices.

8. The optical connector of claim 1, wherein
the plurality of optical devices are arranged together on a flat surface of the base substrate.

9. The optical connector of claim 1, wherein
the optical path changing device comprises a diffraction grating, and
the plurality of optical devices are arranged away from an optical axis line perpendicular to the end surface of the optical fiber sequentially from a position closest to the optical axis line to a position farthest from the optical axis line in an order from an optical device having a shortest wavelength band to an optical device having a longest wavelength band.

10. The optical connector of claim 9, wherein
the first to fourth optical devices having first to fourth wavelength bands that are different from each other,
wherein light having the first wavelength band, which is shortest, is diffracted by a smallest angle while passing through the diffraction grating along an optical path of the first optical device, which is closest to the optical axis line of the optical fiber, and
light having the fourth wavelength band, which is longest, is diffracted by a largest angle while passing through the diffraction grating along an optical path of the fourth optical device, which is farthest from the optical axis line of the optical fiber.

11. The optical connector of claim 10, wherein
light having the first to fourth wavelength bands has relatively large angular deviations at one of an entrance side and an exit side of the optical path changing device, and
the light having the first to fourth wavelength bands has relatively small angular deviations at the other of the entrance side and the exit side of the optical path changing device.

12. The optical connector of claim 1, further comprising:
a plurality of first alignment guides respectively configured to align the plurality of optical devices;
a second alignment guide configured to align the optical fiber; and
a third alignment guide configured to align the optical path changing device, wherein the first to third alignment guides are provided on the base substrate.

13. The optical connector of claim 12, wherein
the plurality of first alignment guides are arranged in a curved shape concave toward the end surface of the optical fiber to surround the end surface of the optical fiber.

14. The optical connector of claim 12, wherein
the first to third alignment guides comprise a first polymer.

15. The optical connector of claim 14, further comprising
a collimator between the optical path changing device and the plurality of optical devices.

16. The optical connector of claim 15, wherein
the collimator comprises a second polymer that is different from the first polymer of the first to third alignment guides.

17. The optical connector of claim 1, wherein
the optical path changing device comprises a prism, and
the plurality of optical devices are arranged away from an optical axis line perpendicular to the end surface of the optical fiber sequentially from a position closest to the optical axis line to a position farthest from the optical axis line in an order from an optical device having a longest wavelength band to an optical device having a shortest wavelength band.

18. The optical connector of claim 17, further comprising:
a plurality of first alignment guides respectively configured to align the plurality of optical devices and a second alignment guide configured to align the optical fiber, the first and second alignment guides being provided on the base substrate; and
a collimator between the optical path changing device and the plurality of optical devices,
wherein the first and second alignment guides comprise a first polymer,
the collimator comprises a second polymer, and
the prism comprises a third polymer, wherein the first to third polymers are different from each other.

19. The optical connector of claim 1, wherein
the polyhedron prism comprises a concave polygonal entrance or exit surface comprising the first to fourth refracting surfaces with different angles continuously connected to each other.

20. The optical connector of claim 1, wherein
the first and fourth refracting surfaces located at peripheral positions among the first to fourth refracting surfaces have relatively large angles with respect to planes perpendicular to optical axes of the first and fourth optical devices, and
the second and third refracting surfaces located at central positions among the first to fourth refracting surfaces have relatively small angles with respect to planes perpendicular to optical axes of the second and third optical devices.

21. The optical connector of claim 20, wherein
the optical paths of the first and fourth optical devices located at peripheral positions among the first to fourth optical devices are changed by relatively large angles by the first and fourth refracting surfaces, and
the optical paths of the second and third optical devices located at central positions among the first to fourth optical devices are changed by relatively small angles by the first and third refracting surfaces.

22. The optical connector of claim 1, wherein
the optical paths of the first to fourth optical devices have relatively large angular deviations at one of an entrance side and an exit side of the polyhedron prism, and
the optical paths of the first to fourth optical devices have relatively small angular deviations at the other of the entrance side and the exit side of the polyhedron prism.

* * * * *